United States Patent [19]
Eriksson

[11] Patent Number: 5,483,532
[45] Date of Patent: Jan. 9, 1996

[54] METHOD OF PACKETING CONTINUOUS DATA INFORMATION AND PACKET DATA IN FRAMES

[75] Inventor: Karl Ö. Eriksson, Askim, Sweden

[73] Assignee: Telefonaktiebolaget LM Ericsson, Stockholm, Sweden

[21] Appl. No.: 236,146

[22] Filed: May 2, 1994

Related U.S. Application Data

[63] Continuation of Ser. No. 907,613, Jul. 2, 1992, abandoned.

[30] Foreign Application Priority Data

Jul. 4, 1991 [SE] Sweden .................................. 9102086

[51] Int. Cl.⁶ ........................................................ H04J 3/16
[52] U.S. Cl. ........................ 370/79; 370/94.2; 370/110.1
[58] Field of Search ........................ 370/94.1, 94.2, 370/60, 60.1, 111, 112, 84, 110.1, 85.7, 85.15, 79, 80, 82, 83, 101, 105.4, 102; 375/112

[56] References Cited

U.S. PATENT DOCUMENTS

| | | | |
|---|---|---|---|
| 4,477,899 | 10/1984 | Kato et al. | 370/60 |
| 4,549,292 | 10/1985 | Isaman et al. | 370/85.15 |
| 4,700,341 | 10/1987 | Huang | 370/84 |
| 4,718,062 | 1/1988 | Andersen | 370/94.1 |
| 4,731,785 | 3/1988 | Ferenc et al. | 370/94.1 |
| 4,761,781 | 8/1988 | Calvignac et al. | 370/94.1 |
| 4,905,225 | 2/1990 | Francois et al. | 370/60 |
| 4,918,687 | 4/1990 | Bustini et al. | 370/60.1 |
| 4,935,921 | 6/1990 | Ishizaki et al. | 375/112 |
| 4,975,952 | 12/1990 | Mabey et al. | 370/94.1 |
| 5,007,045 | 4/1991 | Tsuzuki | 370/94.1 |
| 5,163,047 | 11/1992 | Perdikaris et al. | 370/85.4 |

FOREIGN PATENT DOCUMENTS

| | | |
|---|---|---|
| 0284534 | 9/1988 | European Pat. Off. . |
| 0413123 | 2/1991 | European Pat. Off. . |

Primary Examiner—Douglas W. Olms
Assistant Examiner—Chau T. Nguyen
Attorney, Agent, or Firm—Burns, Doane, Swecker & Mathis

[57] ABSTRACT

In a method of packeting data from sources of continuous data information together with data from sources of packet information in frames, the continuous data information and packet information is put into fields for continuous data and packet fields for packet data, respectively, in each frame. The positions of the two mentioned types of fields are predetermined, and the location of a packet and/or idle space between packet data from a packet network is indicated by means of pointers, the magnitude and type of which are determined by properties of the packet network.

8 Claims, 3 Drawing Sheets

METHOD OF PACKETING CONTINUOUS DATA INFORMATION AND PACKET DATA IN FRAMES

This application is a continuation, of application Ser. No. 07/907,613, filed Jul. 2, 1992, and now abandoned.

TECHNICAL FIELD

The present invention relates to a method of packeting data from sources of continuous data information together with data from sources of packet information in frames, the continuous data information and packet information being put into fields for continuous data and packet fields for packet data, respectively, in each frame.

PRIOR ART

Traditionally digital telecommunications systems have used continuous data flows for transmitting information. In these continuous flows control information in the form of e.g. frame locking words may be coded with a minimum of bits since the frame format is known in the receiver. Information transmission can then be carried through on a number of different media and with a minimum of redundancy.

In local data networkworks (LAN), however, the information is packeted, i.a. for giving more users access to the transmission medium. Several different packeting methods are available for sending the information on the local data network.

If LAN-data shall be transmitted together with telecommunication data (e.g. from multiplexers, switches etc), the resulting composite flow shall be packeted as effectively as possible for minimizing band width need, storing capacity etc. The technique available today for packeting packet information in LAN networkworks can, however, not be used together with continuous information and simultaneously fulfil demands for packeting density and simplicity. This can be illustrated with the three examples given below.

1. As a first example the format can be mentioned, which is described in Higlevel Data Link Control (HDLC) by the International Organization for Standardization (ISO). The method in question can be used, e.g. in CCITT Rec. X.25. For separating the packets so called zero introduction is used. The sequency "01111110" is unique and is used as a start and end flag and can thus not be found in the data field. This means that 0:s have to be introduced in each fifth position in information fields with many 1:s. The method works excellently in a network intended for packet information. In a system transmitting information continuously and having great demands for information density, an information depending redundancy which can be almost 20% is, however, completely unacceptable.

2. Ethernetwork or IEEE 802.3, ISO 8802/3 is a form of LAN using a CSMA/CD protocol for giving the users access to the transmission medium. The transmission medium can take at least four states "1", "0", "idle" and "collision". If this information shall be transmitted together with a continuous data flow this implies that four states are required. This is a too complicated method and requires high band width, alternatively a greater storing capacity. Also in this case a simpler and more effective method is thus required.

3. Token-Ring or IEEE 802/5, ISO 8802/5 uses a "token passing" method for making possible the transmission of information between the networkwork nodes. The information is manchester coded and packet start and packet end, respectively, are separated by violation against the manchester coding principle "violation 1" and "violation 0", respectively. On the transmission medium there are thus the symbols "1", "0", "violation 1" and "violation 0". In the same way as in case (2) the method requires greater band width and storing space than what is desirable.

DESCRIPTION OF THE INVENTION

The object of the invention is to provide a method of packeting continuous data information together with packet data in a system with so high demands for information density that methods of the kind indicated above, used in LAN-network, are not acceptable.

This object has been attained in that, in accordance with the invention, in a method of the kind defined by way of introduction, the positions of the two mentioned types of fields are predetermined, and that the location of a packet and/or idle space between packet data from a packet network is indicated by means of pointers, the magnitude and type of which are determined by properties of the packet network.

By means of the method according to the invention all continuous and packet information is packeted together in a way easily realizable. The amount of redundant information can be minimized if the properties of the source of packet information are known.

DESCRIPTION OF THE DRAWINGS

The invention will now be described more closely below with reference to embodiments appearing from the drawings.

On the drawings

PREFERRED EMBODIMENTS

Figure 1:
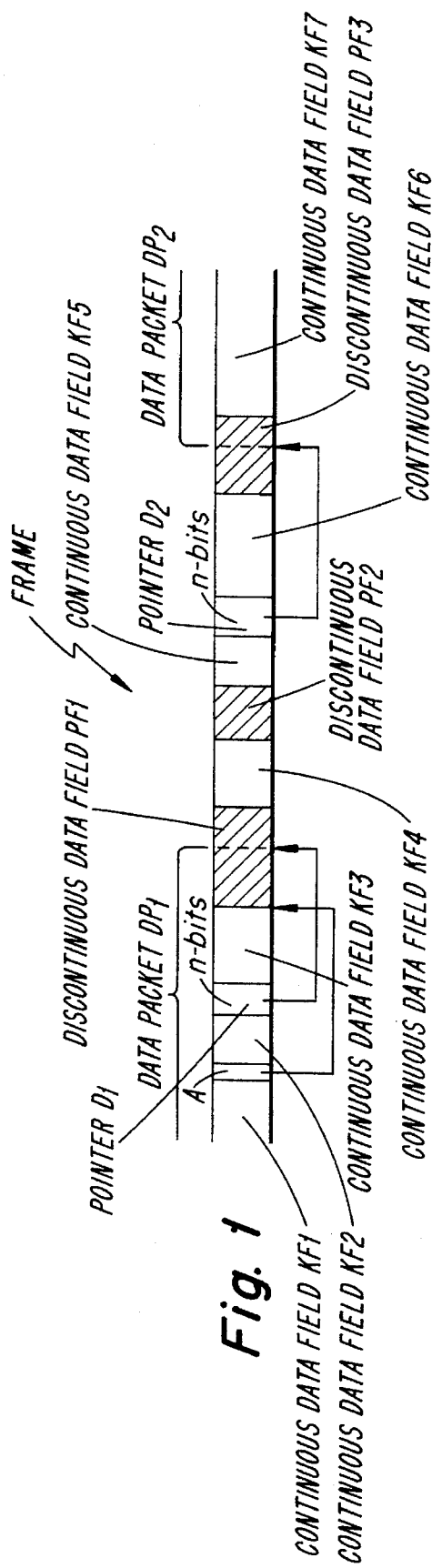
FIGS. 1–5 show examples of frames, in which continuous data information and packet data are packeted together, and FIGS. 6a and 6b in block diagram form show the transmitter portion and the receiving portion, respectively, of equipment for packeting, according to the invention, data from a source of continuous data information together with data from a source of packet information, for transmission in a telecommunication networkwork.

According to the invention data from continuous and discontinuous sources are packeted in frames with determined positions for fields for continuous information and packet fields for packet information, respectively. These fields can, preferably, be mixed with each other over the whole frame, and have been designated with KF and PF, respectively, in FIGS. 1–5. Frame synchronization is provided in a traditional way, i.e. a compromise between detection speed, the smallest possible redundancy, as well as with regard to internal jitter etc. All continuous data are put into the fields intended therefor in the frame together with frame flags, clock adaption, if any, and other control information. Packet data, designated DP in FIGS. 1–5, are put into the packet fields PF which have been reserved in the fixed frame. The beginning and/or end of the information packet, alternatively empty spaces between such packets, from a packet network are marked with pointers, below designated D, R depending upon the type and way of use. These pointers will use a number of n bits determined by properties of the source. One field (1 bit), below designated A, can be used for providing information with respect to whether packet fields in a certain position carry information or are empty. This eliminates the uncertainty at start and can therefore act as a checking means in the receiver. The frequency of the field A is determined by the desired locking in time for packet data and transmission safety in the channel.

When dimensioning the pointer, D or R, regard should be taken to the number of bits of the packet data for each quantisation, and the smallest number of bits M of a packet, and space between packets, respectively. More particularly, the number of bits, n, can be calculated as follows:

n=log (M/N)/log (2)

where

M=the number of bits in the shortest packet or the shortest space between packets.

N=the number of bits for each quantisation of packet data and space, respectively.

If e.g. data from an ETHERNetwork LAN networkwork is mixed with a 8 Mbit/s PCM-flow, the resulting composite frame will require approximately: 10 Mbit/s (Ethernetwork)+8448 kbit/s (PCM)+frame synchronisation+error detection, if any, etc.

It is now possible to use the fact that Ethernetwork information is always quantitised in 8 bits (1 byte) and that the smallest packet length is 64 bytes. Suppose that the space between packets is always greater than 64 bytes and is also quantitised in 8 bits. In this case the pointer field D points to the location where the next transit data/empty space and empty space/data is located, with a resolution of 8 bits. The smallest packet length and empty space length is 64 bytes, this also giving the greatest number of packet bits, 512, between two D or R fields. With the use of the above stated formula n in this case will thus be 6 bits. In the composite frame there can, of course, be more bits between the D and R fields, respectively, but these are in such case PCM bits, frame locking bits, error detection bits or other control information.

As a first example, FIG. 1 shows a portion of a frame produced according to the invention. The portion in question contains, according to the above, fields KF1–KF5 reserved for continuous information, and packet fields PF1, PF2, PF3 reserved for data from packet networkworks, as well as pointer fields D1 and D2. The fields PF can contain data or empty spaces.

In the illustrated frame portion there is contained a portion of a data packet DP1 from a packet network, e.g. the above mentioned LAN-network, as well as portion from another data packet DP2 from the same or another packet network. The end of the packet DP1 is pointed out by the pointer D1 and the beginning of the next packet DP2 by the pointer D2. The packet DP1 begins in a packet field, not shown, and continues in packet fields therebetween, if any, not shown, before reaching and ending in PF1. Between these, KF fields appear, e.g. KF1–KF3. The packet DP2 starts, as can be seen, in PF3 and continues in one or several packet fields, not shown, between which KF fields can be located, e.g. KF7. As should have appeared from the above the later portion of the field PF1, the field PF2, and the beginnning of the field PF3 is empty.

The field A is used in FIG. 1 for providing information with regard to whether the beginning of the packet field PF1 carries information or is empty.

Figure 2:
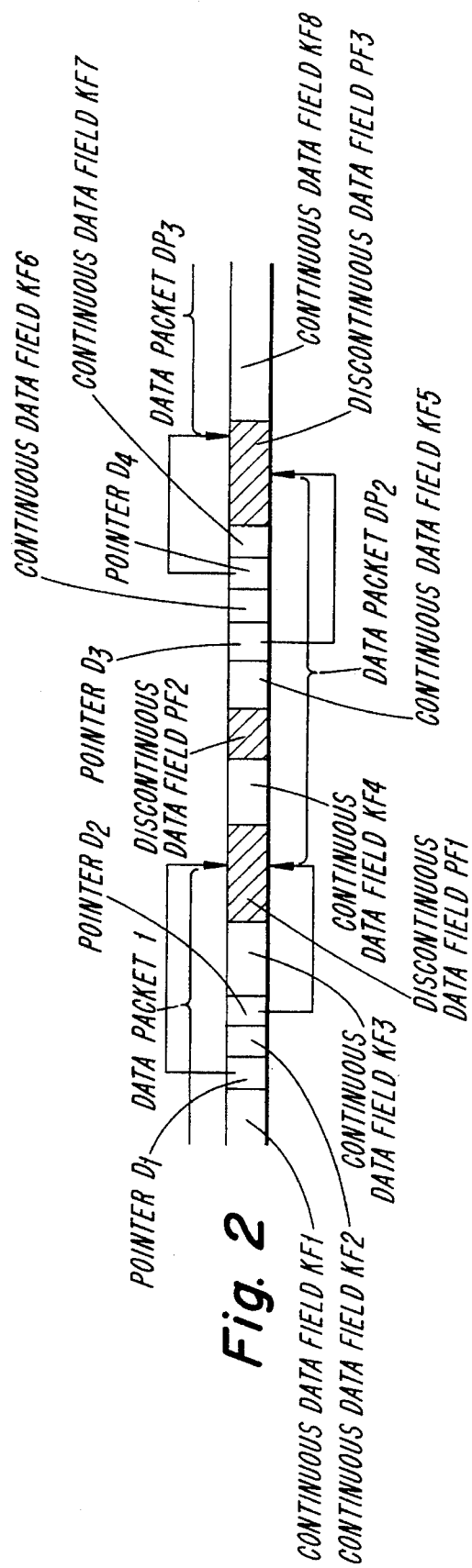

FIG. 2 illustrates an embodiment starting from the assumption that, in the packet network, the shortest empty space period is much shorter than the smallest packet, or the transverse, or alternatively that any of the lengths in question is unknown. The number of bits of the D field and distances between D:s are dimensioned for the greater one of these lengths. The D field is doubled whereby even very short fields can be pointed out. The A field can be cancelled due to the fact that one of the D fields always points out packet starts and the other one always points out packet ends. Accordingly, D1 points out the end of the packet DP1, D2 the beginnning of the packet DP2, D3 the end of DP2, and D4 the beginning of the packet DP3.

Figure 3:
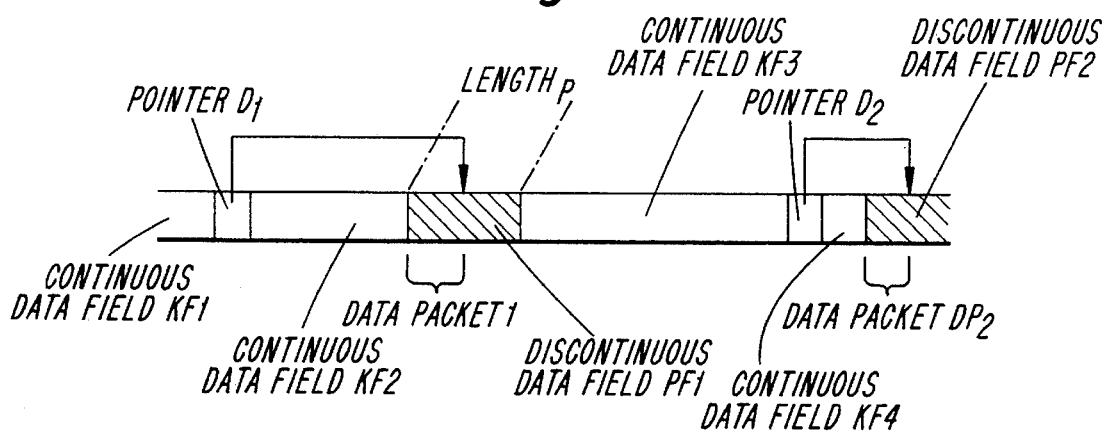

The embodiment according to FIG. 3 starts from the assumption that the maximum packet length is known, that the frequency of packets is small, and that it is tolerable that the packets are delayed. It is then possible to let start of packets, e.g. DP1, DP2, coinside with start of packet fields, e.g. PF1 and P2, respectively, and let the D pointer, e.g. D1, D2, point out the end of packets, e.g. DP1 and DP2, respectively. No A pointer is needed in this case. Alternatively, it is possible to let the start of packets coincide with the end of packet fields and use the pointer for marking the start of the packet.

Figure 4:
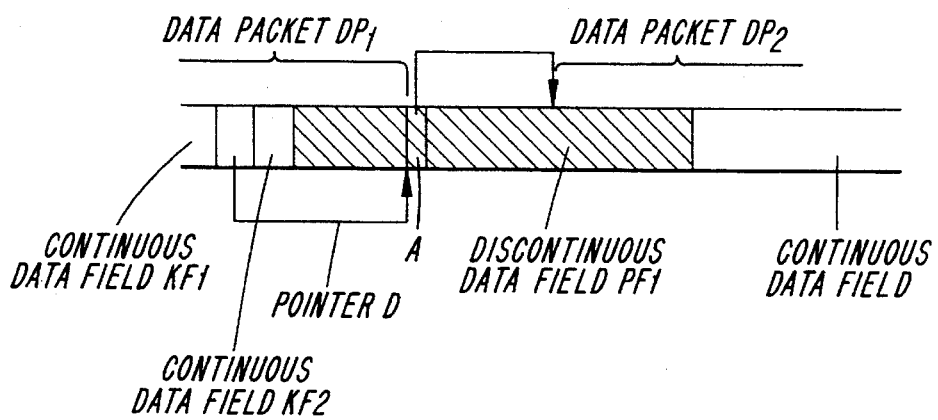

In FIG. 4 the case is shown that the maximum empty space in a packet field is less than a certain value p, and the smallest packet is always greater than a certain value q. The distance between the D fields is dimensioned as depending upon q, and D only points out start of empty space fields. A pointer R is introduced and designed so as to always point out the next packet start. Since the greatest empty space field is known, R may be dimensioned with regard to this. No A field is required. The method also works as well for the transverse, i.e. that the maximum packet is less than p and the smallest empty space period is greater than q. D is used for marking the start of a packet and R is used for marking the start of the next empty space, the distance between D pointers being dimensioned with respect to the length of the smallest empty space, and R being dimensioned with respect to the magnitude of the greatest packet.

Figure 5:
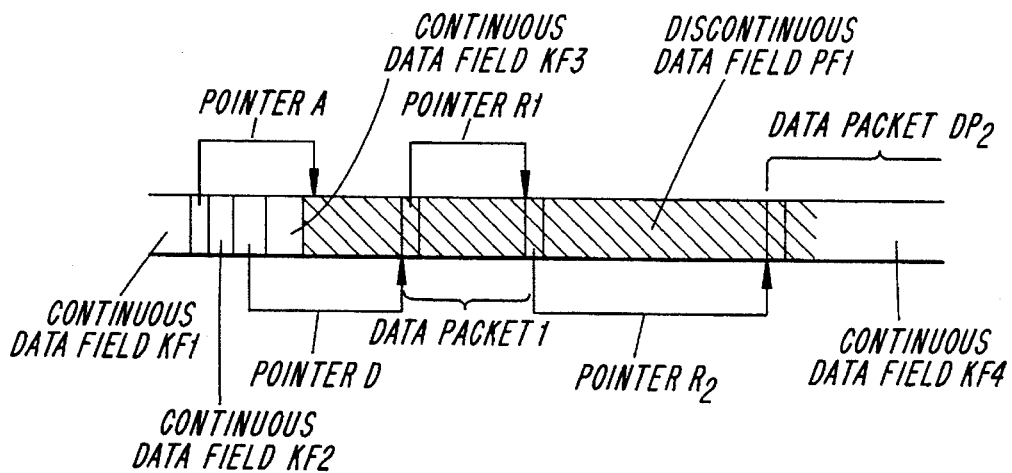

If both empty space and data fields in packet fields are less than a certain value p and q, respectively, both fields can be provided with pointers R1 and R2, respectively, cf. FIG. 5. These are dimensioned with respect to p and q, respectively, and point out the start of the next empty space and packet, respectively. The system is supplemented with a D pointer and an A pointer, if any, for enabling start of detection in the receiver. A can then be used for pointing out if the first bit is data or empty space. Alternatively, A can be cancelled and D point out the first empty space/data transition.

In all cases the A, R and D fields may be mutually exchanged or be distributed over the frame. In certain cases, A and D may be cancelled at continuous operation, and only be used at start. A possible complementary addition for transmission media being exposed to bit errors, is to secure some or all fields (A, R and D) by means of error correcting, or alternatively error detecting codes. Furthermore, the function of A and D can be combined, alternatively be introduced in other portions of the frame.

Figure 6A:
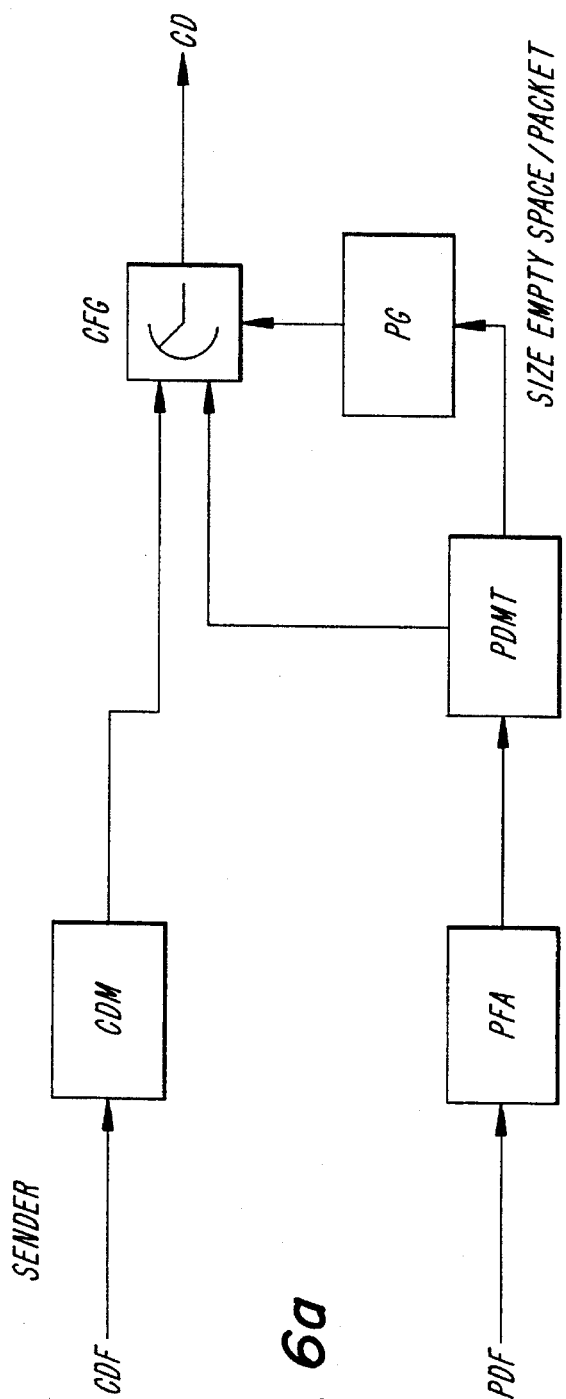
Figure 6B:
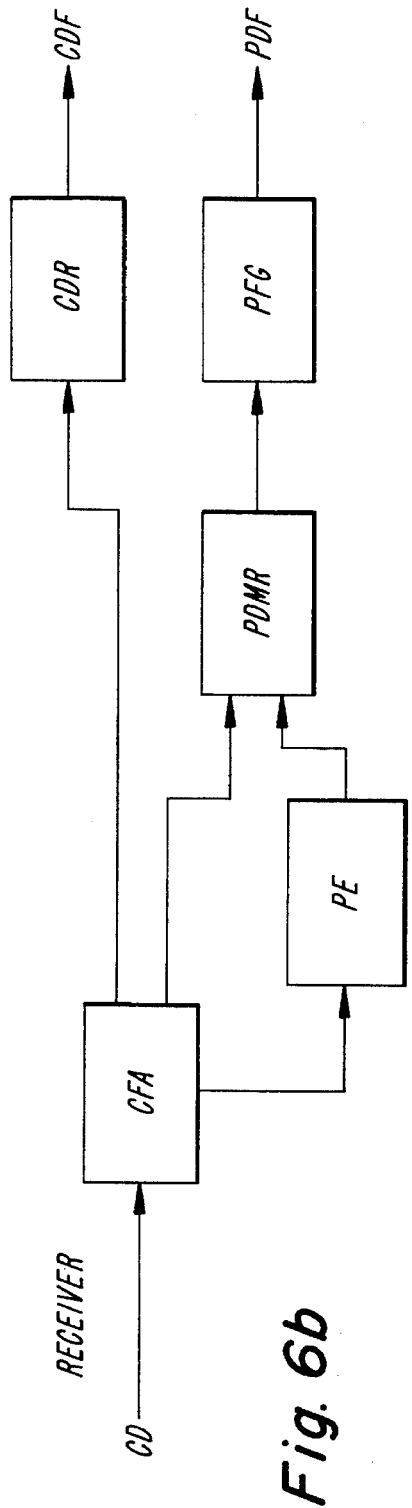

With reference to FIGS. 6a and 6b, a more detailed description shall be made of the transmitter portion and the receiver portion, respectively, of equipment for packeting, in accordance with the invention, data from a source of continuous data information together with data from a source of packet information, for transmission in a telecommunications networkwork.

Two data flows CDF (Continuous Data Flow) and PDF (Packet Data Flow) arrive in a data selector CFG (Composite Frame Generator) included in the transmitter portion, one being of the continuous type and the other one of the packet data type, in order to be added together to a composite data flow CD (Composite Data), as indicated more closely below.

More particularly, at first the data flow of the continuous type is read with a certain rate into a memory CDM (Continuous Data Memory) of the fifo-type, from which it is read out with a higher rate by CFG.

The packet data flow at first arrives to a DCE/DTE, having a frame locking function for detecting the start and the end of packets and, in certain cases, depending upon the type of packet networkworks, transforming the flow for minimizing redundancy and taking away special signs.

From DCE/DTE, packet data arrived to a function PDMT (Packet Data Memory Transmitter) which reads the data into a memory and generates packet information regarding the magnitude of packet/empty space between the packets. CFG then reads the data with a rate predetermined for a composite data flow CD (Composite Data) generated thereby. The packet information is supplied to a pointer generator PG (Pointer Generator) which, guided by the magnitude of packets/empty spaces between packets, generates suitable pointer values A, D, R.

In addition to adding together the data received from CDM and PDMT to the CD flow, CFG generates frame locking words, error detecting/correction fields, clock adaption, if any, for the continuous data flow.

In the receiver the CD-flow arrives in a function CFA (Composite Frame Aligner) which synchronizes to CD by detecting frame locking words. Thereafter CFA distributes continuous data to a function CDR (Continuous Data Recovery) for recovering CDF, pointers (A, R, D) to a pointer determining function PE (Pointer Evaluation), and packet data to a packet data memory PDMR (Packet Data Memory Receiver).

CDR restores rate and levels of the continuous data flow.

PE decides upon start, stop of packets/empty spaces and initiates data supply into PDMR.

PDMR reads in received packets from CFA into the memory guided by PE and feeds out at a suitable rate and time to a function PFG (Packet Frame Generation) which adapts the received packet data to the protocol and the levels required by the packet network, in other words regenerates PDF.

Generally, the area of use of the invention is transmission systems using cables, fibres, radio (high/low frequency), optical systems, etc and storing media such as semiconductor, optical, magnetic and other types of memories. The method is usable in all systems where a continuous data flow is mixed with a packet format.

I claim:

1. A method of packeting data into frames from sources of continuous data information together with information packets from sources of packet information, comprising the steps of:

providing first fields for said continuous data information in predetermined positions in each frame, providing second fields for said information packets in predetermined positions in each frame, and providing pointer fields in each frame, each pointer field contains information either as to where an information packet ends in one of said second fields for said information packets or as to where an information packet begins in one of said second fields for said information packets, wherein dimensions of the pointers are determined by the number of bits of packet data for each quantization and the smallest number of bits of a packet and pause between packets, respectively.

2. A method of packeting data into frames from sources of continuous data information together with information packets from sources of packet information, comprising the steps of:

providing first fields for said continuous data information in predetermined positions in each frame, providing second fields for said information packets in predetermined positions in each frame, and providing pointer fields in each frame, each pointer field contains information either as to where an information packet ends in one of said second fields for said information packets or as to where an information packet begins in one of said second fields for said information packets, wherein a first type of pointer field is used for marking the staff of an empty space or packet and a second type of pointer field is used for marking the start of the next packet and empty space, wherein the distance between pointer fields of the first type is based on the length of the smallest packet and empty space, and the distance between pointer fields of the second type are based on the magnitude of the greatest empty space and packet.

3. A method of packeting data into frames from sources of continuous data information together with information packets from sources of packet information, comprising the steps of:

providing first fields for said continuous data information in predetermined positions in each frame, providing second fields for said information packets in predetermined positions in each frame, and providing pointer fields in each frame, each pointer field contains information either as to where an information packet ends in one of said second fields for said information packets or as to where an information packet begins in one of said second fields for said information packets, wherein empty spaces and packets are each provided with a pointer field for pointing out the start of the respective space or packet said pointer fields being dimensioned based on greatest empty space and greatest data contents of a packet field, respectively, and an additional pointer field is used for pointing out if the first bit is data or empty space.

4. A method according to claim 3, wherein a second additional pointer field is used for pointing out a first empty space/data transition.

5. A method of packeting data into frames from sources of continuous data information together with information packets from sources of packet information, comprising the steps of:

providing first fields for said continuous data information, providing second fields for said information packets, wherein the fields for continuous data information and fields for information packets are mixed with each other over the whole frame, and providing pointer fields in each frame, each pointer field contains information either as to where an information packet ends in one of said second fields for said information packets or as to where an information packet begins in one of said second fields for said information packets, wherein dimensions of the pointers are determined by the number of bits of packet data for each quantization and the smallest number of bits of a packet and pause between packets, respectively.

6. A method of packeting data into frames from sources of continuous data information together with information packets from sources of packet information, comprising the steps of:

providing first fields for said continuous data information, providing second fields for said information packets, wherein the fields for continuous data information and fields for information packets are mixed with each other over the whole frame, and providing pointer fields in each frame, each pointer field contains information either as to where an information packet ends in one of said second fields for said information packets or as to where an information packet begins in one of said second fields for said information packets, wherein a first type of pointer field is used for marking the start of an empty space or packet and a second type of pointer field is used for marking the start of the next packet and empty space, wherein the distance between pointer field of the first type is based on the length of the smallest packet and empty space, and the distance between pointer field of the second type is based on the magnitude of the greatest empty space and packet.

7. A method of packeting data into frames from sources of continuous data information together with information packets from sources of packet information, comprising the steps of:

provides first fields for said continuous data information, providing second fields for said information packets, wherein the fields for continuous data information and fields for information packets are mixed with each other over the whole frame, and providing pointer fields in each frame, each pointer field contains information either as to where an information packet ends in one of said second fields for said information packets or as to where an information packet begins in one of said second fields for said information packets, wherein empty spaces and packets are each provided with a pointer field for pointing out the start of the respective space or packet, said pointer fields being dimensioned based on the greatest empty space and greatest data contents of a packet field, respectively, an additional pointer field is used for pointing out if the first bit is data or empty space.

8. A method according to claim 7, wherein a second additional pointer field is used for pointing out a first empty space/data transition.

* * * * *